(12) United States Patent
Sweitzer et al.

(10) Patent No.: US 11,113,682 B2
(45) Date of Patent: *Sep. 7, 2021

(54) CLOUD-BASED TRANSACTION PROCESSING

(71) Applicant: Tempus Technologies, Inc., Auburn, IN (US)

(72) Inventors: Jason Adley Sweitzer, Auburn, IN (US); Benjamin Allen Hunsberger, Shipshewana, IN (US); Kyle Joseph Jurick, Garrett, IN (US)

(73) Assignee: Tempus Technologies, Inc., Auburn, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/868,153

(22) Filed: May 6, 2020

(65) Prior Publication Data

US 2020/0265401 A1 Aug. 20, 2020

Related U.S. Application Data

(63) Continuation of application No. 16/194,615, filed on Nov. 19, 2018, which is a continuation of application No. 14/410,281, filed as application No. PCT/US2013/032120 on Mar. 15, 2013, now Pat. No. 10,152,704.

(60) Provisional application No. 61/664,382, filed on Jun. 26, 2012.

(51) Int. Cl.
*G06Q 20/20* (2012.01)
*G06F 3/0484* (2013.01)
*H04L 29/08* (2006.01)

(52) U.S. Cl.
CPC ......... *G06Q 20/204* (2013.01); *G06F 3/0484* (2013.01); *G06Q 20/20* (2013.01); *H04L 67/02* (2013.01)

(58) Field of Classification Search
CPC ........ G06Q 40/00; G06Q 20/10; G06Q 20/20; G06Q 20/204
USPC .................. 705/16, 17, 35–39; 235/375–381
See application file for complete search history.

(56) References Cited

U.S. PATENT DOCUMENTS

| | | | |
|---|---|---|---|
| 7,971,782 B1* | 7/2011 | Shams | G06Q 20/3223 235/379 |
| 2003/0213844 A1* | 11/2003 | Yoshida | G07G 1/145 235/383 |

(Continued)

OTHER PUBLICATIONS

John Burke, "Credit card terminals for iPhone," TUAW—The Unofficial Apple Weblog, member of the Weblogs, Inc. Network, Sep. 23, 2009 (Available online at http://www.tuaw.com/2009/09/23/credit-card-terminals-for-iphone/, last visited Dec. 17, 2009). (Year: 2009).*

(Continued)

*Primary Examiner* — Hani M Kazimi
(74) *Attorney, Agent, or Firm* — Barnes & Thornburg LLP

(57) ABSTRACT

A peripheral controller implemented on a server facilitates a transaction initiated at a payment user interface (UI). The peripheral controller is configured to pair the payment UI with a peripheral device, which is configured to receive payment information from a user. The peripheral controller also is configured to communicate with a payment processing system to facilitate processing of a payment request.

30 Claims, 4 Drawing Sheets

(56) References Cited

U.S. PATENT DOCUMENTS

| | | | | |
|---|---|---|---|---|
| 2006/0229998 | A1* | 10/2006 | Harrison | G06Q 30/04 705/78 |
| 2007/0055635 | A1* | 3/2007 | Kanapur | G06Q 20/04 705/75 |
| 2008/0114699 | A1 | 5/2008 | Yuan | |
| 2008/0319836 | A1* | 12/2008 | Aaltonen | G06Q 30/0201 705/7.33 |
| 2009/0037284 | A1* | 2/2009 | Lewis | G06Q 20/202 705/16 |
| 2010/0146155 | A1* | 6/2010 | Brock | G06F 9/4411 710/11 |
| 2010/0235525 | A1* | 9/2010 | McGuire | H04L 61/1541 709/228 |
| 2011/0191237 | A1* | 8/2011 | Faith | G06Q 20/4016 705/39 |
| 2011/0205965 | A1* | 8/2011 | Sprigg | G06F 9/4411 370/328 |
| 2012/0018506 | A1* | 1/2012 | Hammad | G06Q 30/06 235/375 |
| 2012/0066079 | A1* | 3/2012 | Falzone | G06Q 20/202 705/16 |
| 2012/0265623 | A1* | 10/2012 | Zhu | G06Q 30/06 705/16 |
| 2013/0006847 | A1 | 1/2013 | Hammad | |
| 2013/0185152 | A1* | 7/2013 | Aaron | G06Q 20/02 705/14.51 |
| 2013/0297448 | A1* | 11/2013 | Lester | G06Q 30/08 705/26.8 |

OTHER PUBLICATIONS

NeoReader Enterprise and Lavasphere Enterprise Product Brochure, "2D barcode scanning technology tailored to optimize business performance," NeoMedia Technologies, Inc., Atlanta, GA, 2009 (Available online at http://neom. com/readerenterprise-specs. php, last visited Jan. 4, 2010). (Year: 2010).*

John Burke, "Credit card terminals for iPhone," TUAW—The Unofficial Apple Weblog, member of the Weblogs, Inc. Network, Sep. 23, 2009 (Available online at http://www.tuaw.com/2009/09/23/credit-card-terminals-for-iphone/, last visited Dec. 17, 2009).

NeoReader Enterprise and Lavasphere Enterprise Product Brochure, "20 barcode scanning technology tailored to optimize business performance," NeoMedia Technologies, Inc., Atlanta, GA, 2009 (Available online athttp://neom.com/ readerenterprise-specs. php, last visited Jan. 4, 2010).

Office Action; Canadian Application No. 2,878,052; Title: Cloud-Based Transaction Processing; dated Apr. 19, 2018.

International Search Report dated Jun. 3, 2013 in International Application No. PCT/US2013/032120.

International Preliminary Report on Patentability dated Sep. 23, 2014 in International Application No. PCT/US2013/032120.

U.S. Appl. No. 14/410,281, filed Dec. 22, 2014.

U.S. Appl. No. 16/194,615, filed Nov. 19, 2018.

* cited by examiner

CLOUD-BASED TRANSACTION PROCESSING

CROSS-REFERENCE TO RELATED APPLICATIONS

The present application is a continuation of U.S. application Ser. No. 16/194,615 entitled "CLOUD-BASED TRANSACTION PROCESSING," filed Nov. 19, 2018, which is a continuation of U.S. application Ser. No. 14/410,281 entitled "CLOUD-BASED TRANSACTION PROCESSING," filed Dec. 22, 2014 (now U.S. Pat. No. 10,152,704), which is a U.S. National Phase application under 35 U.S.C. § 371 of PCT/US2013/032120 filed Mar. 15, 2013 which claimed priority to U.S. Provisional Application No. 61/664,382, entitled "METHOD TO DECOUPLE PAYMENT PERIPHERALS FROM USER INTERFACE," filed on Jun. 26, 2012. Each of these applications are hereby explicitly incorporated herein, in their entirety, by reference for all purposes.

BACKGROUND

The process of taking non-cash payments from customers is crucial to the flow and success of business. This process generally involves a payment user interface (UI) implemented on a computing device (e.g., a point-of-sale (POS) device or a laptop computer) and one or more attached peripheral devices. The payment UI generally includes software designed to guide a user (e.g., a salesperson or cashier) through the process of gathering information from the customer, product, and/or service, and presenting a total amount due. In current systems, the payment UI interacts with various attached peripheral devices such as, for example, payment card readers, PIN pads, check readers, and receipt printers.

For example, the arrangement is often implemented as a check-out terminal that consists of a payment UI implemented on a computing device that is coupled to peripheral devices using cables (e.g., serial cables). Payment information is processed by the payment UI, causing the entire network and computer systems infrastructure supporting the configuration to be within the scope of Payment Card Industry (PCI) Compliance. Conventional payment processing arrangements involve additional limitations, as well. For example, each peripheral device generally requires a driver that must be installed at the payment UI location and physical mobility generally is not possible with the payment UI because the device on which it is implemented is physically connected to the peripheral devices. Browser support is often limited as web-based payment UI applications need to interact with local hardware such as, for example, by using Active X controls, which are often unreliable when implemented within secure communication environments. Furthermore, application programming interfaces (APIs) used to communicate with peripheral devices typically are not straightforward or standardized; and therefore, to implement peripheral devices in a payment solution, one often must learn a unique API for each peripheral device manufacturer.

SUMMARY

Embodiments of the present invention provide for decoupling communications between peripheral devices and payment UIs, allowing for a flexible and/or mobile sales check-out experience and minimizing exposure of local devices and networks to PCI scope. According to embodiments, a peripheral device is paired with a payment UI instance by a peripheral controller that is implemented on a server. Payment information provided to the peripheral device is processed through the server, thereby avoiding exposure of the payment information to the payment UI.

Figure 1:
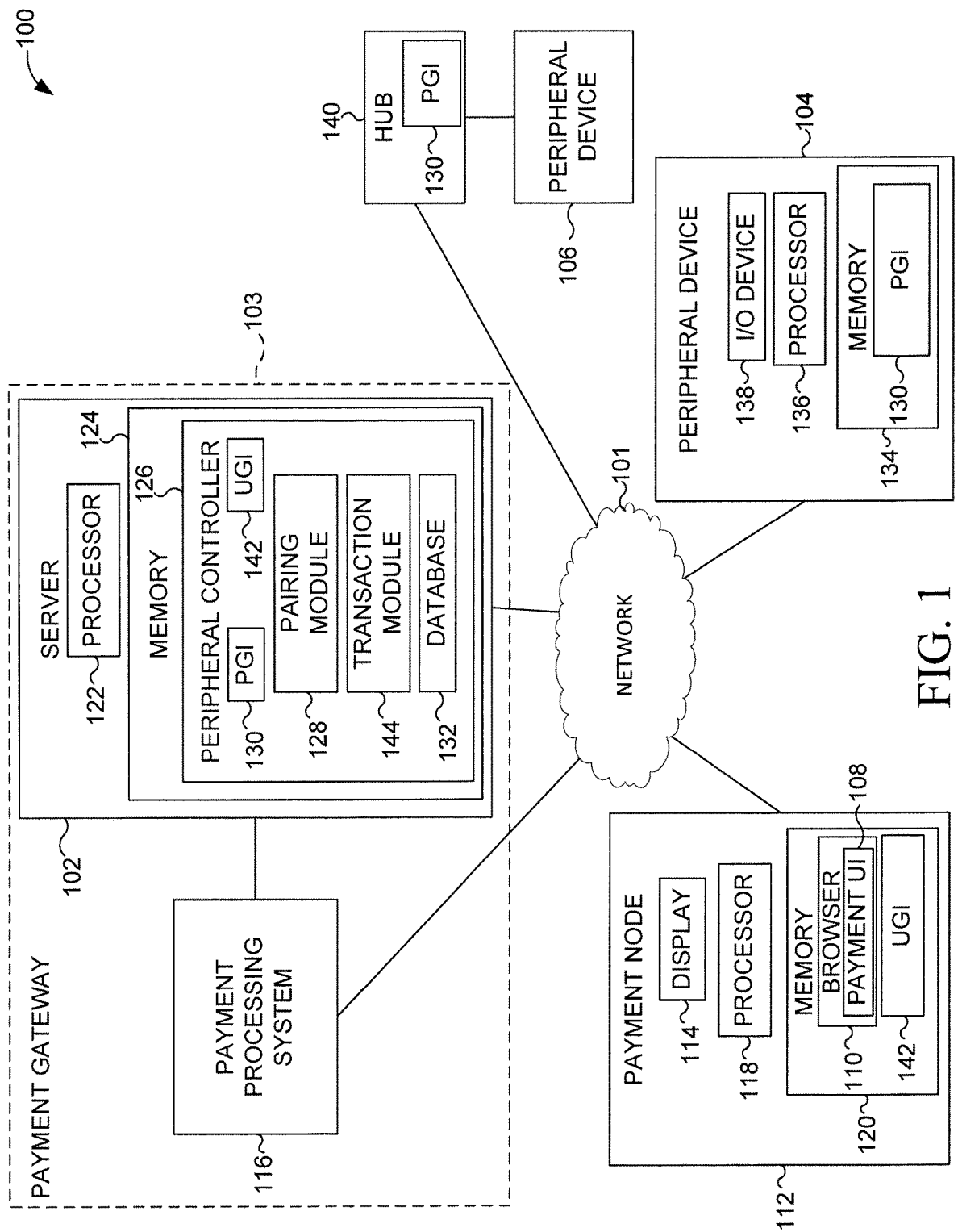
FIG. 1 is a block diagram illustrating an operating environment (and, in some embodiments, aspects of the present invention) in accordance with embodiments of the present invention.

While the present invention is amenable to various modifications and alternative forms, specific embodiments have been shown by way of example in the drawings and are described in detail below. The present invention, however, is not limited to the particular embodiments described. On the contrary, the present invention is intended to cover all modifications, equivalents, and alternatives falling within the ambit of the present invention as defined by the appended claims.

Although the term "block" may be used herein to connote different elements of illustrative methods employed, the term should not be interpreted as implying any requirement of, or particular order among or between, various steps disclosed herein unless and except when explicitly referring to the order of individual steps.

DETAILED DESCRIPTION

Embodiments of the present invention facilitate transactions involving non-cash payments by providing a cloud-based payment solution in which peripheral devices need not be physically coupled to a payment node implementing a payment UI. This allows for, e.g., a payment made to be flexibly coupled to any number of peripheral devices within a given facility. Additionally, embodiments of the present invention may enable more secure use of traditional arrangements in which peripheral devices are physically coupled to the payment node by enabling the peripheral devices to communicate with a server rather than the payment UI. Embodiments of the invention may enable the payment UI to be implemented on a variety of platforms, which need not be restricted to environments guaranteeing device driver support for the peripheral devices.

In embodiments, a server-based peripheral controller (which may be implemented, e.g., in a cloud environment) facilities pairing payment UIs with peripheral devices and facilitates transaction flows between the payment UIs and the paired peripheral devices. Pairing refers to a process of associating a payment UI with a peripheral device, and may be used to facilitate a virtual connection between the payment UI and the peripheral device. In embodiments, a peripheral device may be dynamically associated with any given payment UI at any given time, and any number of peripheral devices may be associated with any number of payment UIs. Additionally, because the connection between a payment UI and a peripheral device is virtual, the payment UI and the peripheral device may be remotely located from each other. Embodiments of the invention also provide a standard interface configured to operate with peripheral devices from disparate vendors, allowing merchants to choose peripheral devices from any desired vendor without needing to learn a unique interface associated with each vendor. By implementing embodiments of the invention, transactions may be processed without exposing sensitive payment information (e.g., in a "clear text" form) to the merchant's devices or network.

FIG. 1 depicts an illustrative operating environment 100 (and, in some embodiments, aspects of the present invention) in accordance with embodiments of the present invention as illustrated by way of example. As shown in FIG. 1, embodiments of the operating environment 100 include a network 101 through which a server 102, which may be implemented as a component of a payment gateway 103, facilitates pairing one or more peripheral devices 104 and 106 with a payment UI 108. The network 101 may be, or include, any number of different types of communication networks such as, for example, a local area network (LAN), a wireless LAN (WLAN), a wide area network (WAN), the Internet, or the like. Components of the operating environment 100 may communicate using secured communications, which may include encryption, certificates, tunneling protocols, virtual private networks (VPNs), and the like. For example, communications over the network 101 may be secured using Transport Layer Security (TLS), Secure Sockets Layer (SSL), or a combination of these.

As shown in FIG. 1, the payment UI 108 may be implemented in a browser 110 hosted by a payment node 112. As the name implies, the payment node 112 is, in embodiments, what a merchant uses to initiate a transaction and includes a display 114. In embodiments, the payment node 112 may include any type of computing device capable of hosting a browser 110 that provides a payment UI 108, which may be presented on the display 114. The payment UI 108 may be provided by, and/or interact with, a payment processing system 116. For example, the payment processing system 116 may include a web server that provides a web page containing the payment UI 108. In embodiments, the payment UI 108 may be implemented using web services, thin client applications, local applications, or the like.

As shown in FIG. 1, the payment node 112 includes a processor 118 and a memory 120. According to embodiments, the payment node 112 includes a computing device and may, for example, take the form of a specialized computing device (e.g., a point-of-sale (POS) device) or a general-purpose computing device such as a personal computer, workstation, personal digital assistant (PDA), mobile device, smartphone, tablet, notebook, or the like. In embodiments, the browser 110 may be stored in the memory 120 and, in embodiments, at least a portion of the payment UI 108 may be stored in the memory 110, for example, as a thin client application. The processor 118 may instantiate the browser 110, which causes at least a portion of the payment UI 108 to be displayed on the display 114. The browser 110 also may facilitate other operations and interactions associated with a transaction such as, for example, receiving transaction information from a user, receiving payment confirmation from the payment gateway 103, generating a payment receipt, and the like, as explained in greater detail below.

The payment UI 108 may facilitate transactions by communicating with the server 102 via a UI/gateway interface (UGI) 142. The UGI 142 may be, or include, any type of interface that enables communications between a payment UI 108 and a server 102 such as, for example, an application programming interface (API). In embodiments, a portion of the UGI 142 may be stored in the memory 120 of the payment node 112 and a portion may be stored in a memory 126 of the server 102. In embodiments, the payment UI 108 may communicate directly with the payment processing system 116.

As shown in FIG. 1, the server 102 also includes a processor 122 and a memory 124, and may be, or include, any type of computing device capable of providing one or more service functions in accordance with aspects of embodiments of the invention, as described herein. As illustrated, the server 102 and the payment processing system 116 may be implemented as components of the payment gateway 103. The payment processing system 116 may be implemented using a device other than the server 102 and, in embodiments, the payment processing system 116 may be implemented on the server 102. For example, the payment processing system 116 and the peripheral controller 126 may each be implemented using separate virtual machines that are hosted by the same computing device or set of computing devices.

The peripheral controller 126 may be stored in the memory 124. In embodiments, the processor 122 executes the peripheral controller 126, which may facilitate pairing one or more peripheral devices 104 and 106 with the payment UI 108, manage pairings, facilitate transaction payments, and the like. The peripheral controller 126 may include a pairing module 128 and a transaction module 144. The pairing module 128 and the transaction module 144 may communicate with the peripheral devices 104 and 106 via a peripheral/gateway interface (PGI) 130. The PGI 130 may be, or include, any type of interface that enables communications between a peripheral device 104 or 106 (or a hub 140, as discussed below) and the peripheral controller 126 such as, for example, an API. In embodiments, a portion of the PGI 130 may be stored in the memory 124 of the server 102 and a portion may be stored in a memory 134 of a peripheral device 104 or a peripheral hub 140.

Information associated with a pairing may be stored in a database 132 in the memory 124. The database may be, or include, a table, a relational database, a multi-dimensional cube, and the like. Embodiments of the server 102 also include an administrative portal (not shown) that allows administrators to access the database 132 and/or otherwise determine which peripheral devices are paired with which payment UIs. For example, the server 102 may maintain administrator accounts such that administrators may provide credentials (e.g., passwords) and may be provided access, based on a set of associated permissions to portions of data stored in the database 132.

As shown in FIG. 1, in embodiments, the peripheral device 104 may be "aware" of the server 102 (e.g., configured to communicate with the server 102) and may include a memory 134, a processor 136 and one or more input/output (I/O) devices 138. Examples of I/O devices 138 include, without limitation, magnetic card readers, scanners, keypads, PIN pads, display devices, and the like. As illustrated, in other or consistent embodiments, the peripheral device 106 may not be aware of the server 102 and may be connected (e.g., via a wired or wireless connection) to a peripheral hub 140 that communicates with the server 102 via the PGI 130. Thus, the hub 140 facilitates communication between the server 102 and other devices that otherwise would not readily be able to communicate with the server 102. According to embodiments, the peripheral hub 140 may be, or include, software, firmware, hardware and/or a combination of these.

For example, in embodiments, the peripheral hub 140 may include a hardware device having a number of physical communication ports (e.g., universal serial bus (USB) ports) to which one or more peripheral devices 106 may be coupled. In aspects of this example, peripheral hub 140 may register the one or more peripheral devices 106 such that, upon connecting a peripheral device 106 to the peripheral hub 140, a pairing between the peripheral device 106 and the payment UI 108 may be established automatically. In embodiments, the peripheral hub 140 may be a component of a peripheral device 104 (e.g., a check reader) that also includes physical communication ports to which another peripheral 106 (e.g., a receipt printer) may be coupled.

In embodiments, using a peripheral hub 140 may facilitate implementation of a payment node 112 to which one or more peripheral devices 104 are physically connected (e.g., an arrangement in which the payment node 112 implements a web-based payment UI application 108 that is configured to receive payment information from a local peripheral device). That is, the peripheral hub 140 may be, or include, one or more software components stored in the memory 120 of the payment node 112 that, when executed by the processor 118, facilitate communications between one or more local peripheral devices that are registered with the peripheral hub 140 and the server 102. For example, the peripheral hub 140 may be a software component that serves as a communication bridge between the one or more local peripheral devices and the server 102. In this manner, embodiments of the invention enable peripheral devices to communicate information to the server 102, and vice versa, while avoiding the challenges of traditional communications with local hardware implemented using Active X controls. In configurations such as these, for example, end-to-end encryption techniques may be used to prevent exposure of payment information to aspects of the payment UI 108.

According to embodiments, various components of the operating environment 100, illustrated in FIG. 1, can be implemented on one or more computing devices. For example, each of the server 102, the peripheral devices 104 and 106, the payment node 112, the payment processing system 116, and the hub 140 may be, or include, one or more computing devices. A computing device may include any type of computing device suitable for implementing embodiments of the invention. Examples of computing devices include "workstations," "servers," "laptops," "desktops," "tablet computers," "hand-held devices," "POS devices," "card readers," "check readers," and the like, all of which are contemplated within the scope of FIG. 1 and reference to various components of the operating environment 100.

In embodiments, a computing device includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in embodiments, the computing device may include a number of processors, a number of memory components, a number of I/O ports, a number of I/O components, and/or a number of power supplies. Additionally any number of these components or combinations thereof may be distributed and/or duplicated across a number of computing devices.

In embodiments, the memories 120, 124, and 134 include computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; or any other medium that can be used to encode information and can be accessed by a computing device such as, for example, quantum state memory, and the like. In embodiments, the memories 120, 124, and 134 store computer-executable instructions for causing the processors 118, 122, and 136, respectively, to perform aspects of embodiments of methods and procedures discussed herein. Computer-executable instructions may include, for example, computer code, machine-useable instructions, and the like such as, for example, program components capable of being executed by one or more processors associated with a computing device. Examples of such program components include the browser 110, the payment UI 108, the pairing module 128, the PGI 130, the database 132, the UGI 142, and the transaction module 144. Some or all of the functionality contemplated herein may also be implemented in hardware and/or firmware.

The illustrative operating environment 100 shown in FIG. 1 is not intended to suggest any limitation as to the scope of use or functionality of embodiments of the present invention. Neither should the illustrative operating environment 100 be interpreted as having any dependency or requirement related to any single component or combination of components illustrated therein.

Figure 2:
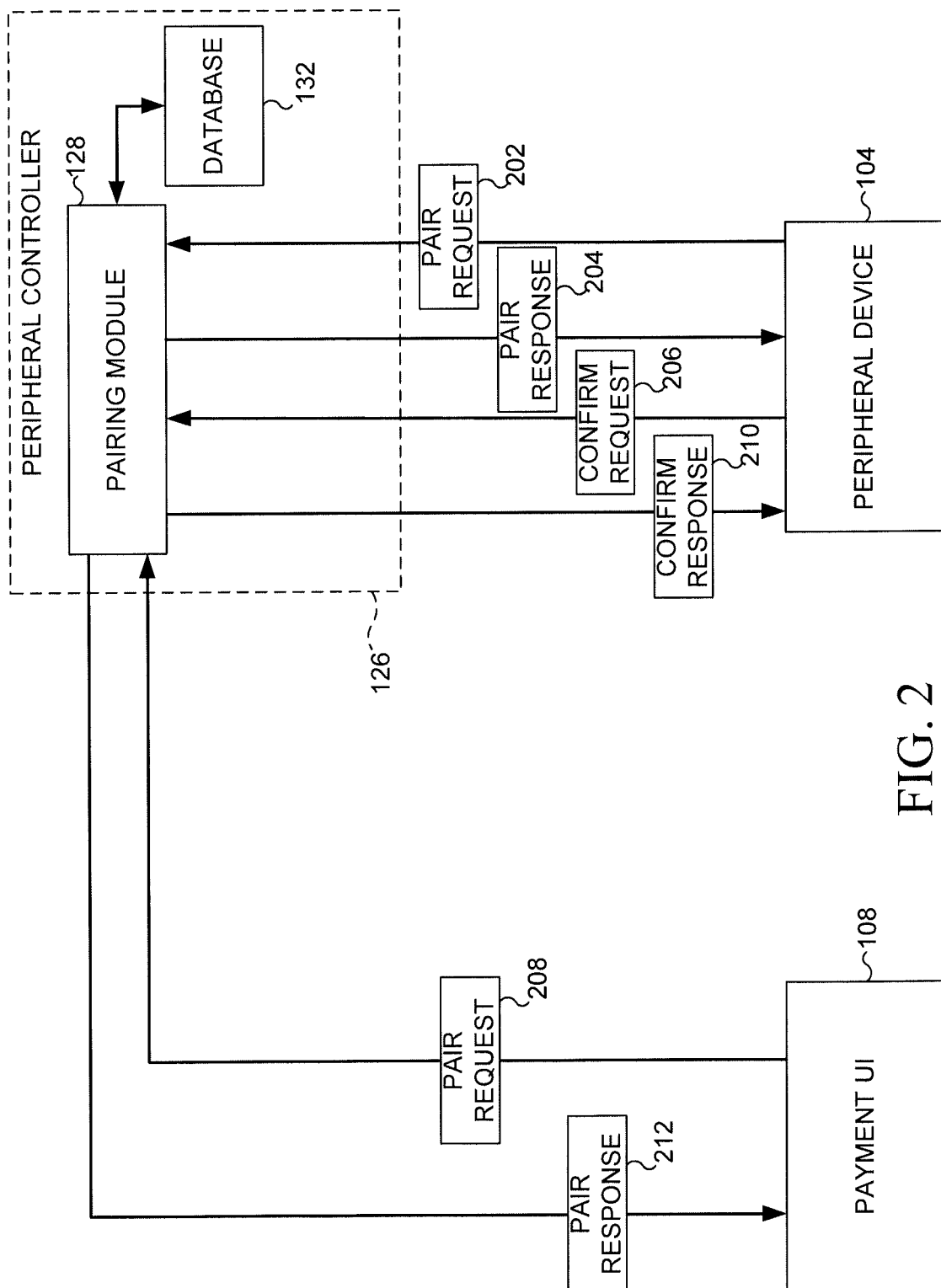
FIG. 2 is a schematic diagram depicting an illustrative pairing operation in accordance with embodiments of the present invention.

FIG. 2 is a schematic diagram depicting an illustrative pairing operation in accordance with embodiments of the present invention. According to embodiments, the pairing operation may be accomplished using hypertext markup language (HTTP) communications such as, for example, the HTTP POST process, which is a synchronous process that utilizes requests and responses. By implementing pairing processes using HTTP POST, pair requests may be timed out if a response is not received after a specified amount of time. Additionally, in embodiments, HTTP POST communications flow through firewalls and proxies with relative ease, thereby minimizing the technical effort expended in implementing aspects of embodiments of the invention.

As shown in FIG. 2, a peripheral 104 (or a hub 140, acting on behalf of a peripheral 106) provides a pair request 202 to the pairing module 128 of the peripheral controller 126. The pair request 202 may be provided (and received by the pairing module 128) using the PGI 130 and may be created using any number of different formats such as, for example, extensible markup language (XML). A pairing between a peripheral 104 or 106 and a payment UI 108 may be identified using a unique identifier, referred to herein as a "pair ID." According to embodiments, a pairing operation may be an open pairing operation (in which the peripheral 104, or hub 140, generates the pair ID), or a closed pairing operation (in which the pairing module 128 generates the pair ID).

In embodiments, for example, aspects of an open pairing operation may be used for pairing a peripheral device that is coupled to, or integrated with, the payment node 112. For example, the payment node 112 may include a peripheral hub 140 (e.g., software executable by the browser 110) that registers one or more local peripheral devices. The pairing module 128 may store a hub ID in the database 132 and associate the hub ID with the payment UI 108. Upon pairing a local peripheral device with the payment UI, the pairing module 128 may provide a cookie to the peripheral hub 140, which is stored in the memory 120 such that, when the payment node 112 is activated and/or communicates with the server 102, the cookie may be provided to the pairing module 128, thereby facilitating an automatic pairing of the local peripheral device with the payment UI 108. For example, a JavaScript executed by the browser 110 may register the payment UI 108 with the pairing module 128 and the cookie may facilitate access to the pairing module 128, via a single uniform resource locator (URL), by both the peripheral hub 140 and the payment UI 108.

In an open pairing operation, the pair request 202 may include an indication of the type of communication, an indication of a peripheral device type, and an identifier of the peripheral device 104, as well as a pair ID. According to embodiments, the pair ID may be generated based on a user input such as, for example, a payment card number or a checking account number. For example, in embodiments in which the peripheral 104 includes a magnetic card reader, a user may swipe a payment card (e.g., credit card, debit card, or the like) through the magnetic card reader, which may use at least a portion of the payment card number to generate the pair ID. The pair ID may be, or include, the last four digits of the payment card number, a hash of at least a portion of the payment card number, or the like. In embodiments in which the peripheral 104 includes a check reader, the pair ID may include at least a portion of the account number on the check, at least a portion of an account number manually entered by the user, a hash of at least a portion of an account number, or the like. Any check or card may be used to facilitate an open pairing operation, as the operation is not a transaction involving a payment. In a closed pairing operation, the pair request 202 may include an indication of the type of communication, an indication of a peripheral device type, and an identifier of the peripheral device 104.

In response to receiving the pair request 202, the pairing module 128 processes the request 202 and provides a pair response 204 to the peripheral 104. In an open pairing operation, the pairing module 128 stores the pair ID in the database 132, and associates the pair ID with the peripheral device 104. Additional information may be stored in the database, as well, as described more fully below with reference to FIG. 3. The pair response 204 may include, for example, an acknowledgement of receipt of the pair request 202 and an indication that the pairing module 128 is awaiting a communication from the payment UI 108. In embodiments, as shown in FIG. 2, the peripheral 104 may provide a pair confirmation request 206 to the pairing module 128. This pair confirmation request 206 may include, for example, an acknowledgement of receipt of the pair response 204 and a timeout indication that informs the pairing module 128 of an amount of time that the peripheral device 104 will wait for the pairing operation to be completed before severing its communication with the pairing module 128.

As is shown in FIG. 2, the payment UI 108 provides a pair request 210 to the pairing module 128. In embodiments, the pair request 210 may include information such as a payment node ID, a payment node certificate, an indication of the type of communication (e.g., an indication that the communication includes a pair request), an indication of a payment UI type, and the like. The pair request 210 may also include the pair ID discussed above. For example, in a closed pairing operation, the peripheral device 104 may include a display device (e.g., I/O device 138) that presents, to a user, the pair ID generated by the pairing module 128 so that the user may provide (e.g., using a keyboard) the pair ID to the payment UI 108. Additionally, in an open pairing operation, the payment card, check, or other information source that is used to generate the pair ID may also be used to provide the pair ID to the payment UI 108. For example, the payment node 112 may include a card reader, check reader, or other input device (e.g., a keyboard) that can be used to provide the pair ID to the payment UI 108. In embodiments of an open pairing operation, the pair request 210 may occur, for example, before the pair request 202 such as where a user initiates the pairing operation via the payment UI 108 by keying in a pair ID (e.g., the last four digits of a payment card number) or swipes a payment card through a magnetic card reader coupled to the payment node 112.

The pairing module 128 receives and processes the pair request 210. Information from the pair request 210 may be stored in the database 132 and associated with other information stored therein. The pairing module 128 may also generate a unique payment UI ID (UIID) and associate the UIID with other information included in the pair request 210, information provided in the pair request 202, or the like. For example, the pairing module 128 may associate the UIID with the peripheral ID and/or the pair ID. Any number of additional, or alternative, associations may be established between various types of information in the database 132 to facilitate the pairing operation. As shown in FIG. 2, the pairing module 128 may provide a pair confirmation response 210 to the peripheral device 104 and a pair response 212 to the payment UI 108. The pair response 212 may include information that indicates whether the pairing operation was successful, the peripheral ID, and the like. After the pairing operation is successfully completed, the payment UI 108 and the peripheral device 104 may be utilized, in conjunction with the peripheral controller 126, to complete a transaction operation.

Figure 3:
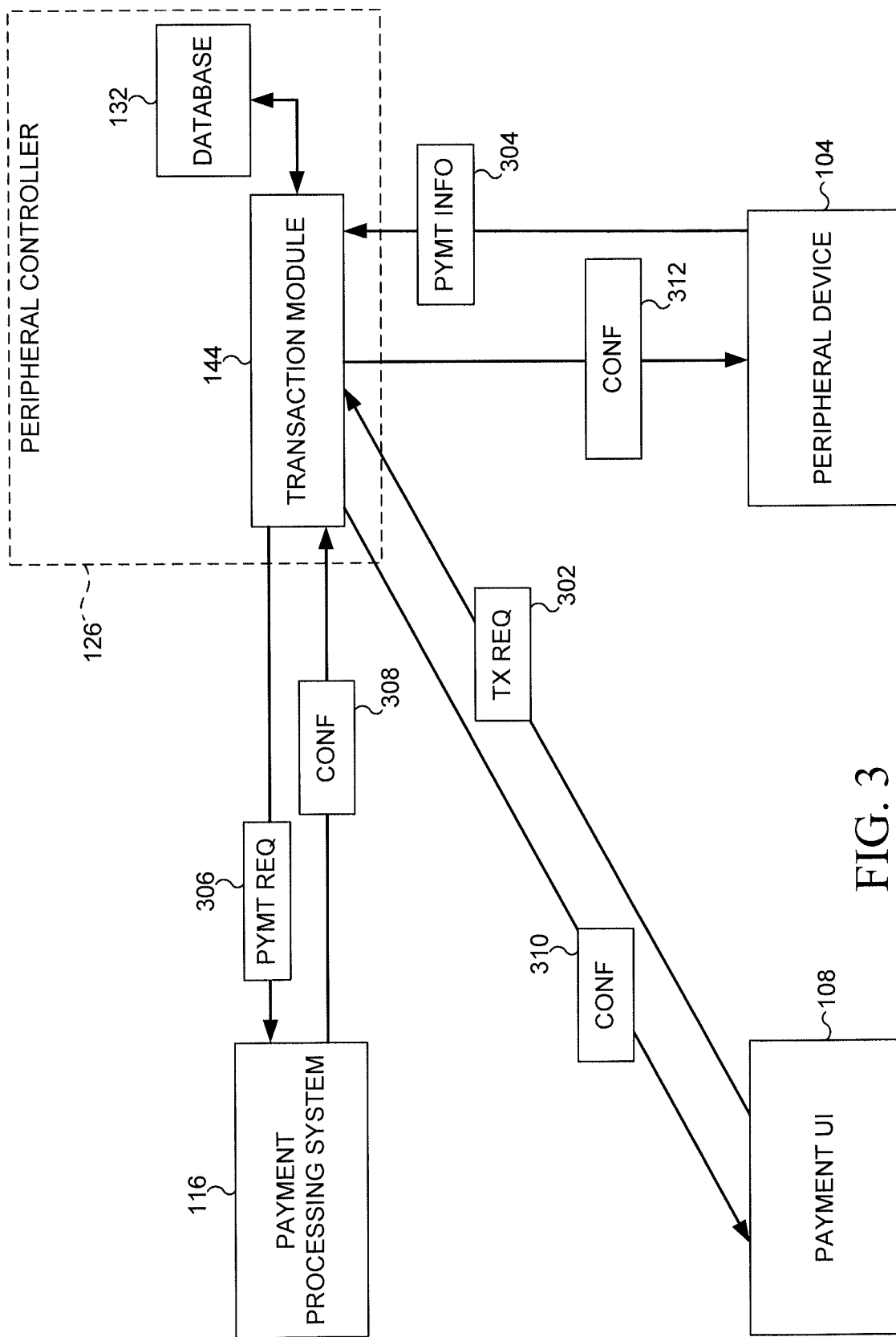
FIG. 3 is a schematic diagram depicting an illustrative transaction operation in accordance with embodiments of the present invention.

FIG. 3 is a schematic diagram depicting an illustrative transaction operation in accordance with embodiments of the present invention. A transaction may be initiated at the payment UI 108. For example, a user (e.g., a sales associate, cashier, or the like) may provide transaction information to the payment UI 108 by inputting the information using a user input device (e.g., a keyboard, mouse, keypad, or the like), by scanning a barcode, or the like. Additionally, in embodiments, a transaction operating may be initiated at a peripheral device 104 or 106.

As shown in FIG. 3, the payment UI 108 provides a transaction request (labeled "TX REQ") 302 to the transaction module 144 of the peripheral controller 126. The transaction request 302 and/or any number of other communications illustrated in FIG. 3 may utilize web communication techniques such as, for example, Asynchronous JavaScript and XML (AJAX), JavaScript Object Notation (JSON), Asynchronous JavaScript and JSON (AJAJ), HTTP POST, or the like, and may utilize an interface such as an API (e.g., the UGI 142 and/or the PGI 130, shown in FIG. 1). The transaction request 302 may include at least a portion of the transaction information provided to by the user and may include additional transaction information such as information generated by the payment UI 108, information associated with a peripheral device 104 or 106, or the like. Examples of transaction information include, without limitation, a unique transaction identifier (ID), an identification of the subject matter (e.g., good or service) of the transaction, an identification of one or more parties to the transaction, an indication of an expected payment amount, information associated with a payment plan, and the like.

As shown in FIG. 3, the transaction module 144 receives the transaction request 302 and may, in embodiments, store a transaction identifier (ID) in the database 132 to establish a record corresponding with the transaction. In embodiments, the transaction module 144 may initiate a corresponding transaction instance that can be used by the transaction module 144 to facilitate processing a payment request associated with the transaction. In embodiments, the payment UI 108 may provide the transaction request 302 to the payment processing system 116, which may provide the transaction request 302 to the transaction module 144 of the peripheral controller 126 and may include additional information with the transaction request 304 such as, for example, an identifier (ID) associated with the payment processing system 116, a second transaction identifier (ID) generated, or otherwise used, by the payment processing system, communication information (e.g., port IDs, security tokens, identifications of communication protocols), and the like.

As shown in FIG. 3, the transaction module 144 receives payment information 304 from the peripheral device 104. In embodiments, the transaction module 144 may provide a payment information request to the peripheral device 104, which may prompt a user to provide payment information. In other embodiments, a user may provide payment information to the peripheral device 104 without being prompted. Payment information 304 may include, for example, credit card information (e.g., a credit card number, expiration date, and security code), debit card information (e.g., a debit card number and personal identification number (PIN)), check information (e.g., a scanned image of a check and a checking account number), or the like. The payment information 304 may also include, for example, a transaction ID corresponding to the transaction initiated at the payment UI 108, a pair ID, a peripheral ID, and/or the like.

In embodiments, the transaction module 144 associates the payment information 304 with the transaction information received in the transaction request 302. As shown in FIG. 3, the transaction module 144 provides a payment request (labeled "PYMT REQ") 306 to the payment processing system 116. The payment request 306 includes at least a portion of the payment information 304 and may include at least a portion of the transaction information provided in the transaction request 302, any number of different types of identifiers (e.g., transaction IDs, pair IDs), and/or the like. The payment processing system 116 processes the payment request 306 such as, for example, by processing a credit card payment, debit card payment, check payment, or the like. In embodiments, the payment processing system 116 may interact with payment gateways, third-party payment service vendors, banks or other financial institutions, and/or the like.

Additionally, in embodiments, the payment processing system 116 may provide a request (not shown) for additional payment information to the transaction module 144, which may, in response, request the additional information from the peripheral device 104. For example, the peripheral device 104 may include a magnetic card reader that reads payment information 304 from a debit card or credit card, and the payment processing system 116 may further communicate a request to the peripheral device 104 for a PIN or signature, respectively. In this case, the peripheral device 104 may prompt the user for the PIN or signature, for example, and provide the additional payment information (e.g., the PIN or a digitally captured signature) to the transaction module 144, which may provide the same to the payment processing system 116. Any number of requests and responses such as these may be communicated among the payment processing system 116, the transaction module 144, and the peripheral device 104 to facilitate processing a payment in accordance with embodiments of the invention.

After successfully processing the payment request 306, the payment processing system 116 may provide a confirmation (labeled "CONF") 308 of the successfully processed payment request 306 to the transaction module 144, which may provide a confirmation 310 of the successful payment to the payment UI 108. The transaction module 144 may, in embodiments, also provide a payment confirmation response 312 to the peripheral device 104 (e.g., in embodiments in which the payment information 304 is communicated using HTTP POST, which expects a response). If a payment request 306 is not successfully processed (e.g., due to insufficient funds, communication errors, unsuccessful authentication or permission procedures, or the like), the confirmations 308, 310, and 312 may indicate the unsuccessful attempt at processing the payment request 306. Additionally, in embodiments, the payment processing system 116 may provide a receipt (or instructions for printing a receipt) to the transaction module 144, which may provide the receipt or instructions to a receipt printer. The receipt printer may, for example, be coupled to, or integrated with, the peripheral device 104, coupled to, or integrated with, the payment node 112, or implemented as a separate peripheral device 104 or 106.

According to embodiments of the invention, a number of additional pairing and transaction arrangements may be implemented. For example, a number of device stations, each station having peripheral devices (e.g., card readers, check readers, receipt printers, and the like) coupled to a peripheral hub, may be distributed about a sales floor. Each station may have an associated barcode (or other information-encoding image) that has a pair ID encoded therein. A sales clerk using a mobile device may move about with a customer, entering items into a payment UI executed on the mobile device. When the customer is ready to check out, the sales clerk may approach a device station and, using a barcode scanner, camera, or other image-capturing device associated with the mobile device, scan the barcode associated with the device station. The scanned barcode provides the pair ID to the payment UI and, in response to receiving the pair ID, the payment UI may initiate a pairing operation that pairs the peripheral devices at the station with the payment UI (e.g., by sending a pair request having the pair ID to a peripheral controller). In embodiments, the mobile device may have an associated barcode (or other similar image), and a barcode scanner at the device station may cause a peripheral-initiated pairing processes to be performed.

Figure 4:
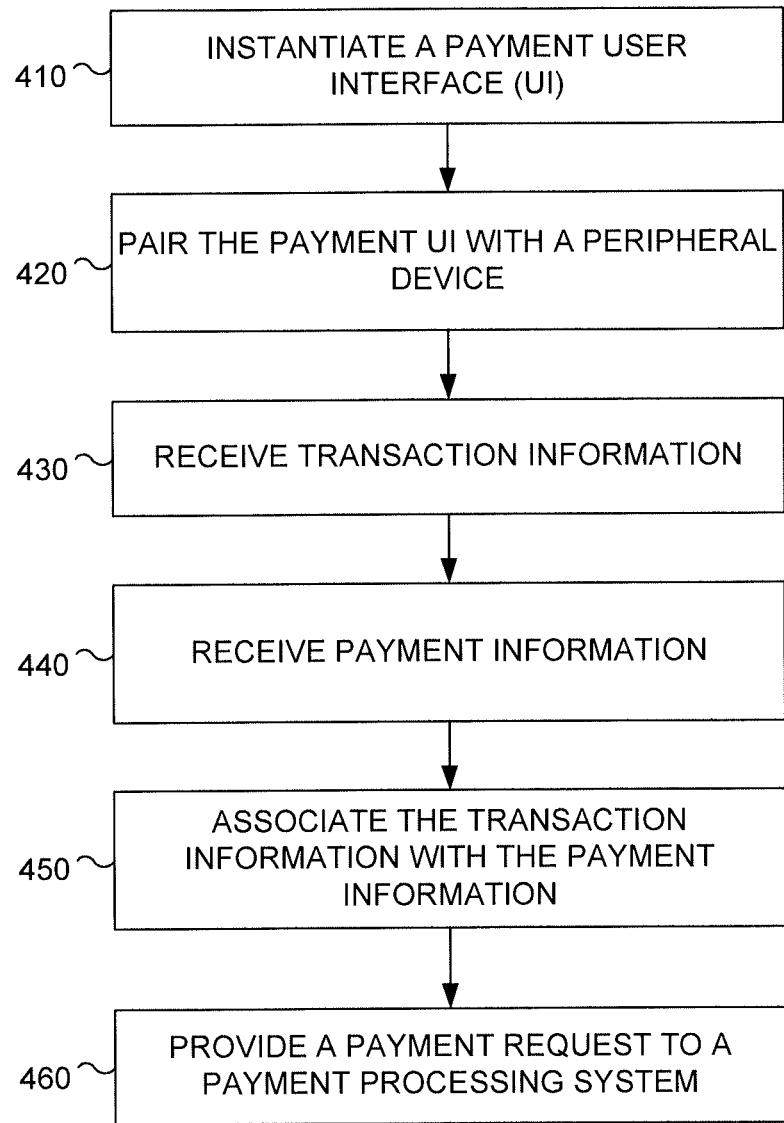
FIG. 4 is a flow diagram depicting an illustrative method of facilitating a transaction in accordance with embodiments of the present invention.

As described above, a peripheral controller may facilitate pairing a peripheral device with a payment UI to facilitate a transaction in which the payment UI does not receive payment information. FIG. 4 is a flow diagram depicting an illustrative method 400 of facilitating a transaction in accordance with embodiments of the present invention. Embodiments of the illustrative method 400 include implementing a payment UI (e.g., the payment UI 108 shown in FIG. 1) at a payment node (e.g., the payment node 112 shown in FIG. 1) (block 410). The payment UI may be implemented as a thin client application, a local application, or the like. For example, the payment node may include a computing device that hosts a web browser that may be used to present a web page that includes the payment UI, a POS device that implements the payment UI using web services, or the like.

As shown in FIG. 4, embodiments of the method 400 include pairing the payment UI with a peripheral device (e.g., the peripheral device 104 or 106 shown in FIG. 1) (block 420). A server (e.g., server 102 shown in FIG. 1) may be used to pair the payment UI with the peripheral device and may include, for example, a peripheral controller (e.g., the peripheral controller 126 shown in FIG. 1) that facilitates the pairing operation. As discussed above, the pairing operation may include an open pairing operation, in which the peripheral device provides a pair ID, or a closed operation, in which the peripheral controller provides the pair ID. Additionally, a pairing between a peripheral controller and a payment UI may be configured to persist for any desired period of time and may be configured to be terminated upon any desired condition or event. For example, in embodiments, pairings may be maintained until changed, or terminated, administratively.

According to embodiments of the method 400, the peripheral controller receives transaction information corresponding to a transaction initiated at the payment UI (block 430). The payment UI may provide the transaction information directly to the peripheral controller or may provide the transaction information to a payment processing system (e.g., the payment processing system 116 shown in FIG. 1), which may provide the transaction information to the peripheral controller. The peripheral controller receives payment information from the peripheral device (block 440) and associates the transaction information with the payment information to create a payment request (block 450). As shown in FIG. 4, the peripheral controller provides the payment request to the payment processing system (block 460), which processes the payment request. The payment processing system may provide a confirmation indicating whether the payment was successful. In embodiments, the payment processing system may provide receipt information to the peripheral controller, which can provide the receipt information to a peripheral printer. In this manner, the peripheral controller may also facilitate printing transaction receipts so that the payment UI is not exposed to the receipt information.

While embodiments of the present invention are described with specificity, the description itself is not intended to limit the scope of this patent. Rather, the inventors have contemplated that the claimed invention might also be embodied in other ways, to include different steps or features, or combinations of steps or features similar to the ones described in this document, in conjunction with other technologies.

The following is claimed:

1. A cloud-based server to facilitate a payment transaction, the server comprising:
 a database having stored thereon pairing relationships between a plurality of peripheral devices and a plurality of payment user interfaces (UIs), wherein the pairing relationships comprise associations between respective peripheral devices of the plurality of peripheral devices and respective payment user UIs of the plurality of payment UIs, wherein at least a portion of the associations between respective peripheral devices of the plurality of peripheral devices and respective payment user UIs of the plurality of payment UIs are based on peripheral IDs that uniquely identify respective peripheral devices and identifiers that identify respective payment UIs;
 a processor;
 a memory coupled to the processor and having stored therein a plurality of instructions that, when executed, cause the server to:
  receive a transaction request from a requesting payment UI of the plurality of payment UIs including transaction information corresponding to a payment transaction;
  determine a paired peripheral device of the plurality of peripheral devices corresponding to the requesting payment UI based on one or more pairing relationships in the database to establish a cloud-based virtual connection between the paired peripheral device and the requesting payment UI, thereby decoupling a need for a physical connection between a payment node on which the requesting payment UI is implemented and the paired peripheral device of the plurality of peripheral devices, wherein a display on which the requesting payment UI is to be displayed and paired peripheral device are local to each other, but geographically remote from the cloud-based server;
  request payment information from the paired peripheral device of the plurality of peripheral devices based on the transaction information received from the requesting payment UI;
  receive payment information from the paired peripheral device of the plurality of peripheral devices;
  associate the transaction information with the payment information to create a payment request; and
  providing the payment request to a payment processing system.

2. The cloud-based server of claim 1, wherein the transaction request includes a unique transaction identifier (ID).

3. The cloud-based server of claim 2, wherein the transaction request further includes one or more of an identification of the subject matter of the transaction, an identification of one or more parties to the transaction, an indication of an expected payment amount, or information associated with a payment plan.

4. The cloud-based server of claim 2, further comprising one or more instructions to receive a request for additional payment information not included in the payment request from the payment processing system and, responsive to the request for additional payment information from the payment processing system, send a request for the additional payment information requested by the payment processing system to the paired peripheral device.

5. The cloud-based server of claim 4, wherein the request for additional payment information comprises one or more of a PIN or a signature.

6. The cloud-based server of claim 1, further comprising one or more instructions to receive a successful payment confirmation from the payment processing system indicating successful payment to a merchant associated with the requesting payment UI, and responsive to the successful payment confirmation, send a message to one or more of the requesting payment UI or paired peripheral device indicating successful processing of payment to the merchant.

7. The cloud-based server of claim 1, further comprising one or more instructions to receive a unsuccessful payment notification from the payment processing system indicating unsuccessful payment processing to a merchant associated with the requesting payment UI, and responsive to the unsuccessful payment notification, send a message to one or more of the requesting payment UI or paired peripheral device indicating unsuccessful processing of payment to the merchant.

8. The cloud-based server of claim 1, further comprising one or more instructions to prevent payment information received from the paired peripheral device from being communicated to the requesting payment UL.

9. The cloud-based server of claim 1, wherein the identifiers in the database that identify respective payment Uls are based on one or more of a payment node identifier (ID), a payment node certificate, a payment UI type indicator, a pair identifier (UI), or a payment UI identifier (UIID).

10. A cloud-based server to facilitate a payment transaction, the server comprising:
  a database, on at least one cloud-based server, having stored thereon pairing relationships between a plurality of peripheral devices and a plurality of payment user interfaces (Uls), wherein the pairing relationships comprise associations between respective peripheral devices of the plurality of peripheral devices and respective payment user Uls of the plurality of payment Uls, wherein at least a portion of the associations between respective peripheral devices of the plurality of peripheral devices and respective payment user Uls of the plurality of payment Uls are based on peripheral IDs that uniquely identify respective peripheral devices and identifiers that identify respective payment Uls;
  a peripheral controller, executed by a processor on the cloud-based server, to facilitate a cloud-based virtual connection between a payment UI and a peripheral device by establishing one or more pairing relationships in the database between respective peripheral devices of the plurality of peripheral devices and respective payment user Uls of the plurality of payment Uls in the database in response to one or more pairing requests, wherein the peripheral controller is to establish the pairing relationships by associating peripheral IDs that uniquely identify respective peripheral devices and one or more identifiers that identify respective payment Uls in the database; and
  wherein the peripheral controller is to facilitate a payment transaction, wherein to facilitate a payment transaction comprises: (i) receiving a transaction request from a requesting payment UI of the plurality of payment Uls, wherein the transaction request includes transaction information corresponding to a payment transaction, (ii) determining a paired peripheral device of the plurality of peripheral devices based on one or more pairing relationships in the database, thereby decoupling a need for a physical connection between a payment node on which the requesting payment UI is implemented and the paired peripheral device of the plurality of peripheral devices, wherein a display on which the requesting payment UI is to be displayed and the paired peripheral device are local to each other, but geographically remote from the cloud-based server, (iii) requesting payment information from the paired peripheral device based on the transaction information received from the requesting payment UI, (iv) receiving payment information from the paired peripheral device, (v) associating the transaction information with the payment information to create a payment request, and (vi) providing the payment request to a payment processing system.

11. The cloud-based server of claim 10, further comprising a peripheral-gateway interface (PGI), on the cloud-based server, which facilitates communication between the paired peripheral device and peripheral controller.

12. The cloud-based server of claim 11, wherein the PGI comprises an application programming interface (API) to facilitate communications between the paired peripheral device and peripheral controller.

13. The cloud-based server of claim 10, further comprising a UI-gateway interface (UGI), on the cloud-based server, which facilitates communication between the requesting payment UI and peripheral controller.

14. The cloud-based server of claim 13, wherein the UGI comprises an application programming interface (API) to facilitate communications between the requesting payment UI and peripheral controller.

15. The cloud-based server of claim 10, wherein the transaction request includes a unique transaction identifier (ID).

16. The cloud-based server of claim 15, wherein the transaction request further includes one or more of an identification of the subject matter of the transaction, an identification of one or more parties to the transaction, an indication of an expected payment amount, or information associated with a payment plan.

17. The cloud-based server of claim 10, wherein the peripheral controller is to receive a request for additional payment information not included in the payment request from the payment processing system and, responsive to the request for additional payment information from the payment processing system, send a request for the additional payment information requested by the payment processing system to the paired peripheral device.

18. The cloud-based server of claim 17, wherein the request for additional payment information comprises one or more of a PIN or a signature.

19. The cloud-based server of claim 10, wherein the peripheral controller is to receive a successful payment confirmation from the payment processing system indicating successful payment to a merchant associated with the requesting payment UI, and responsive to the successful payment confirmation, send a message to one or more of the requesting payment UI or paired peripheral device indicating successful processing of payment to the merchant.

20. The cloud-based server of claim 10, wherein the peripheral controller is to receive a unsuccessful payment notification from the payment processing system indicating unsuccessful payment processing to a merchant associated with the requesting payment UI, and responsive to the unsuccessful payment notification, send a message to one or more of the requesting payment UI or paired peripheral device indicating unsuccessful processing of payment to the merchant.

21. The cloud-based server of claim 10, wherein the peripheral controller is to prevent payment information received from the paired peripheral device from being communicated to the requesting payment UL.

22. The cloud-based server of claim 10, wherein the identifiers in the database that identify respective payment Uls are based on one or more of a payment node identifier (ID), a payment node certificate, a payment UI type indicator, a pair identifier (UI), or a payment UI identifier (UIID).

23. A method comprising:
  receive, by a server and from a requesting payment UI of a plurality of payment Uls in a database on the server, a transaction request including transaction information corresponding to a payment transaction;
  determine, by the server, a paired peripheral device from a plurality of peripheral devices in the database corresponding to the requesting payment UI based on one or more pairing relationships in the database to establish a cloud-based virtual connection between the paired peripheral device and the requesting payment UI, thereby decoupling a need for a physical connection between a payment node on which the requesting payment UI is implemented and the paired peripheral device of the plurality of peripheral devices, wherein a display on which the requesting payment UI is to be displayed and paired peripheral device are local to each other, but geographically remote from the server;

request, by the server, payment information from the paired peripheral device based on the transaction information received from the requesting payment UI;

receive, by the server and from the paired peripheral device, payment information; associate, by the server, the transaction information with the payment information to create a payment request; and providing, by the server, the payment request to a payment processing system.

24. The method of claim 1, wherein the transaction request includes a unique transaction identifier (ID).

25. The method of claim 24, wherein the transaction request further includes one or more of an identification of the subject matter of the transaction, an identification of one or more parties to the transaction, an indication of an expected payment amount, or information associated with a payment plan.

26. The method of claim 25, wherein the request for additional payment information comprises one or more of a PIN or a signature.

27. The method of claim 23, further comprising receiving a successful payment confirmation from the payment processing system indicating successful payment to a merchant associated with the requesting payment UI, and responsive to the successful payment confirmation, sending a message to one or more of the requesting payment UI or paired peripheral device indicating successful processing of payment to the merchant.

28. The method of claim 23, further comprising receiving a unsuccessful payment notification from the payment processing system indicating unsuccessful payment processing to a merchant associated with the requesting payment UI, and responsive to the unsuccessful payment notification, sending a message to one or more of the requesting payment UI or paired peripheral device indicating unsuccessful processing of payment to the merchant.

29. The method of claim 23, further comprising securing, by the server, payment information received from the paired peripheral device to prevent access to the payment information by the requesting payment UL.

30. The method of claim 23, wherein database has stored thereon pairing relationships between a plurality of peripheral devices and a plurality of payment user interfaces (UIs), wherein the pairing relationships comprise associations between respective peripheral devices of the plurality of peripheral devices and respective payment user UIs of the plurality of payment UIs, wherein at least a portion of the associations between respective peripheral devices of the plurality of peripheral devices and respective payment user UIs of the plurality of payment UIs are based on peripheral IDs that uniquely identify respective peripheral devices and identifiers that identify respective payment UIs.

* * * * *